United States Patent Office 3,117,726
Patented Jan. 14, 1964

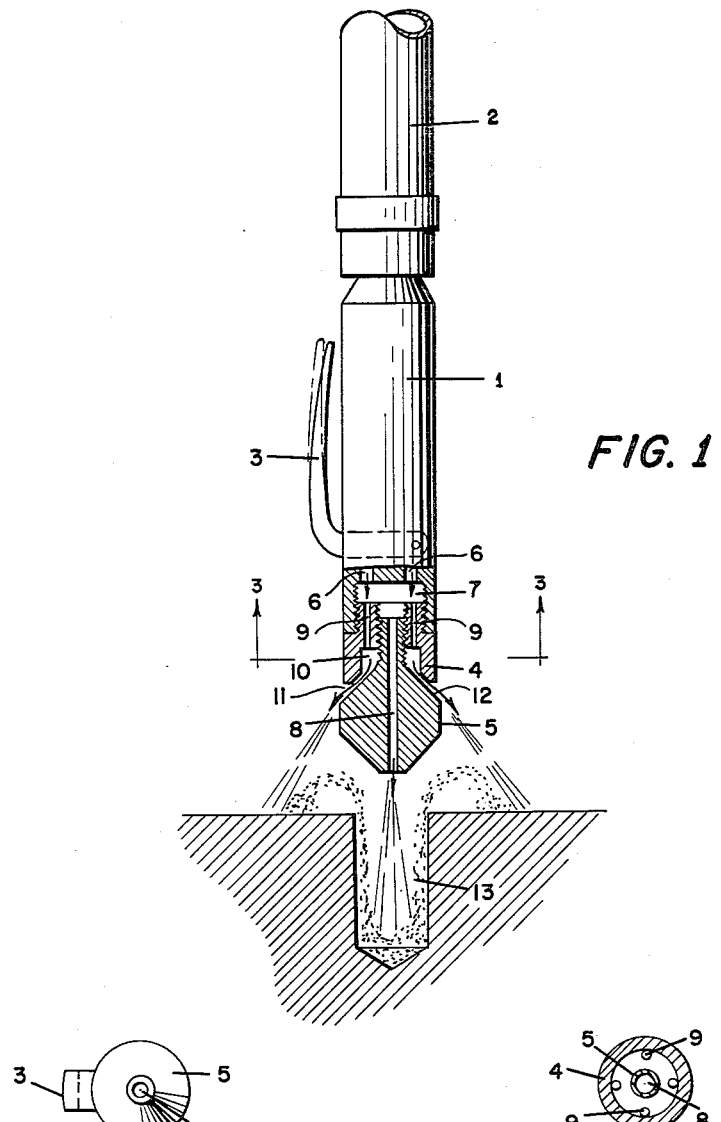

3,117,726
DETACHABLE APPARATUS FOR CLEANING HOLLOWS BY BLOWING
Börje Lennart Schöberg, Tallasen, Lidingo, Sweden
Filed Feb. 3, 1960, Ser. No. 6,411
1 Claim. (Cl. 239—291)

The present invention relates to an apparatus for cleaning hollows, particularly those occurring in objects produced in workshop manufacturing processes, by blowing and more particularly to a blow gun attachment therefor. When a hole, for instance, is to be drilled to a certain depth in a work piece without perforation, some of the drillings remain in the hole. To remove these drillings, it is customary to blow the hole clean with compressed air, which issues in the form of a strong jet from a blow gun which is held above the drilled hole. The compressed air stream must be strong enough to dislodge even the heaviest drilling chips, as a consequence of which it tends to remove the lighter chips a considerable distance. The worker holding the blow gun in his hand is often hit by drilling chips of the kind just referred to and not rarely he is even exposed to eye damage.

These inconveniences are obviated in the apparatus according to the present invention, which is characterized in that a central air stream is directed into the hollow for removing loose particles, there being formed simultaneously around the central air stream immediately adjacent the issuing point thereof a circumferential screen formed of streaming air, thereby to catch or retain particles dislodged from the hollow. This is achieved by means of a blow gun, which is provided according to the invention with a central nozzle conduit for compressed air and, outside thereof, with an annular aperture or row of apertures for compressed air.

The invention is illustrated by an embodiment shown on the attached drawing. FIG. 1 is a side view in partial axial section of a blow gun according to the invention when in operation. FIG. 2 is an end view of the blow gun. FIG. 3 shows a cross section along the line III—III of FIG. 1.

A blow gun body 1 of conventional construction is attached to an air hose 2 and provided with a valve, which may be opened by pressure exerted on a lever 3. Screwed into the blow gun body 1 is a nozzle sleeve 4, into which is screwed a nozzle cone 5. The blow gun body 1 has two passages 6 leading to a distribution chamber 7. Leading away from the chamber, there is, on the one hand, a middle conduit 8 passing through the nozzle cone 5 and, on the other hand, four conduits 9 passing through the nozzle sleeve 4 to a collecting chamber 10, which is provided with an annular aperture 11 between the external end of the nozzle sleeve 4 and a conical guiding surface 12 provided on the nozzle cone.

It will be assumed that the blow gun according to the invention is to be used for blowing clean a drilled blind hole 13 in a work piece. The blow gun is then directed towards the hole 13 in the manner shown in FIG. 1 and the lever 3 is pressed against the body 1. The valve then opens and compressed air issues from the passages 6 to the distribution chamber 7 and flows on therefrom out through the middle conduit 8 as well as through the conduits 9 to the collecting chamber. This chamber is filled and the air then flows on and issues through the angular aperture 11. A stream or jet thus issues from the central conduit 8 and enters the hole 13 so as to remove the drillings therefrom. Simultaneously, air issues from the annular aperture 11 forming a screen of streaming air at some distance above the hole 13. This air screen catches or retains particles thrown away from the drilled hole making them fall down on the work piece. It is particularly suitable from the point of view of effectiveness that the air screen be downwardly directed having the generating line thereof form approximately an angle of 45° with the central air stream. Alternatively, the FIG. 1 screen could be cylindrical or it might extend horizontally or even upwardly. The velocity or air quantity of the air stream should evidently be selected so as not to counteract the dislodging operation performed by the central air stream in the hole. A certain small degree of adjustment of the screen air velocity can be obtained by inward or outward screwing of the nozzle cone 5, whereby the guiding surface 12 thereof is positioned at the larger or smaller distance from the external end of the nozzle sleeve 4.

The constructive realization for obtaining the damping air screen in cooperation with the central working air stream is obviously subject to variation. For instance, the annular aperture 11 could be replaced by a row of tightly spaced apertures, adapted to form a continuous air screen. The central working stream might be composed of two or more jets. The blow gun is adapted to be used for blowing clean any kind of hollows, cavities or the like. The central air stream and the air screen could be fed from different air supply channels, whereby the possibilities of adjustment with regard to the relative strength of the working stream and the screen are obtained.

What is claimed is:

A safety nozzle for detachable mounting on an air blow gun body having valved air supply means and a threaded outlet port therein, said nozzle comprising in combination a nozzle sleeve having a threaded portion thereon adapted to screw into said threaded outlet port and also having defined therein an axial central passage and an annular chamber with smooth walls and channels communicating with said air supply means in the air blow gun body, a nozzle cone axially adjustable and projecting into said central passage of said nozzle sleeve, said nozzle cone having defined therein an axial central bore in communication with the air supply means through said axial central passage in said nozzle sleeve for conducting a central jet, said nozzle cone defining with said nozzle sleeve an annular aperture adapted to project a conical shield of air outward from the nozzle.

References Cited in the file of this patent

UNITED STATES PATENTS

| | | |
|---|---|---|
| 2,320,964 | Yates | June 1, 1943 |
| 2,604,361 | Yates | July 22, 1952 |
| 2,783,092 | Gavin et al. | Feb. 26, 1957 |